United States Patent
Biasi et al.

(10) Patent No.: US 7,286,686 B2
(45) Date of Patent: Oct. 23, 2007

(54) METHOD AND SYSTEM FOR DELIVERY OF ALTERNATIVE OR SUPPLEMENTAL MATERIAL TO A DESIGNATED RECIPIENT OF A MAIL PIECE

(75) Inventors: Theresa Biasi, Shelton, CT (US); Andrei Obrea, Seymour, CT (US)

(73) Assignee: Pitney Bowes Inc., Stamford, CT (US)

( * ) Notice: Subject to any disclaimer, the term of this patent is extended or adjusted under 35 U.S.C. 154(b) by 378 days.

(21) Appl. No.: 11/009,742

(22) Filed: Dec. 10, 2004

(65) Prior Publication Data

US 2006/0215877 A1    Sep. 28, 2006

(51) Int. Cl.
*G06K 9/00* (2006.01)
*G06Q 4/00* (2006.01)
*G06F 17/00* (2006.01)

(52) U.S. Cl. .................. 382/101; 705/60; 705/406

(58) Field of Classification Search ............ None
See application file for complete search history.

(56) References Cited

U.S. PATENT DOCUMENTS 6,175,827 B1 * 1/2001 Cordery et al. ............ 705/410
2003/0130954 A1 * 7/2003 Carr et al. ................. 705/60

* cited by examiner

*Primary Examiner*—Bhavesh M Mehta
*Assistant Examiner*—Charles Kim
(74) *Attorney, Agent, or Firm*—Steven J. Shapiro; Charles R. Malandra, Jr.; Angelo N. Chaclas

(57) ABSTRACT

A method and system for delivering alternative material to a designated recipient of a mail piece. A user system scans a mail piece to read an identifier affixed thereto. The system uses information in the identifier to access a database and download alternative digital material provided by a mailer. The alternative material is then delivered electronically to a designated recipient of the mail piece.

9 Claims, 6 Drawing Sheets

METHOD AND SYSTEM FOR DELIVERY OF ALTERNATIVE OR SUPPLEMENTAL MATERIAL TO A DESIGNATED RECIPIENT OF A MAIL PIECE

BACKGROUND OF THE INVENTION

The subject invention relates to a method and system for delivery of mail within large organizations such as businesses or government agencies or other organizations that act as intermediate recipients of mail for members of the organization. More particularly, it relates to a method and system for the delivery of material which is alternative or supplemental to a mail piece to a recipient of that mail piece, who can be designated by name, title or function.

A prototype system for scanning incoming mail and other documents and delivering the scanned images electronically within an organization has been developed and internally tested by the assignee of the present application under the program name "dMail". In the prototype "dMail" system, a mail piece envelope is scanned to determine routing information, the mail piece contents are scanned to create a digital image, and the digital image is delivered electronically in accordance with the routing information. As presently implemented "dMail" does not use information from the mail piece contents to determine routing information.

While such systems have proven effective, useful and efficient for the delivery of document images within an organization, problems remain due to the inherent loss of information in the scanning process. Many direct marketers invest a great deal of time in designing the physical characteristics of a direct mail piece (e.g. color, shape, size, etc.) since these characteristics can impact the recipient's tendency to open and respond to the offer. When a mail piece is scanned and delivered electronically, many of these characteristics are lost, thereby reducing the value to the direct marketer (and in some cases to the recipient).

It is also known to link information to various objects by affixing barcodes which when scanned cause a data processing system to access an Internet web page. One system for so linking information is marketed by the Digital Convergence Corporation under the trade name "CueCat".

Thus, it is an object of the subject invention to provide a method and system for accessing, and delivering to a designated recipient of a mail piece, alternative material (hereinafter sometimes alternative digital material, or alternative material).

BRIEF SUMMARY OF THE INVENTION

The above object is achieved and the disadvantages of the prior art are overcome in accordance with the subject invention by a method and system operating in accordance with that method, for: a) scanning the mail piece for address information; b) determining a recipient address in accordance with the address information; c) scanning the mail piece for an identifier and reading identifying information from the identifier; d) identifying and accessing the alternative material in accordance with the identifying information; and e) delivering the alternative material to the recipient address.

In accordance with one aspect of the subject invention, a) a determination based upon the identifier is made and, in accordance with the determination either: the contents of the mail piece are scanned to obtain scanned content information, and the scanned content information is delivered to the recipient address together with the alternative material; the mail piece is delivered to the recipient address without scanning the contents; or the mail piece is discarded without scanning the contents.

In accordance with another aspect of the subject invention, the alternative material includes response software for determining and returning to a mailer data representative of a recipient's response to the alternative material.

In accordance with another aspect of the subject invention, the alternative material includes multimedia material.

In accordance with still another aspect of the subject invention, a) the alternative material is stored; b) identifying information derived from scanning the identifier is received from an intermediate recipient of the mail piece; and c) the alternative material is provided to the intermediate recipient.

In accordance with still another aspect of the subject invention, a mail piece having affixed thereto an identifier, the identifier associating the mail piece with alternative material is provided.

Other objects and advantages of the subject invention will be apparent to those skilled in the art from consideration of the detailed description set forth below and the attached drawings.

BRIEF DESCRIPTION OF THE DRAWINGS

Preferred embodiments of the subject invention are illustrated in the figures of the accompanying drawings in which like reference numerals refer to similar elements, and in which.

DETAILED DESCRIPTION OF PREFERRED EMBODIMENTS OF THE INVENTION

Figure 1:
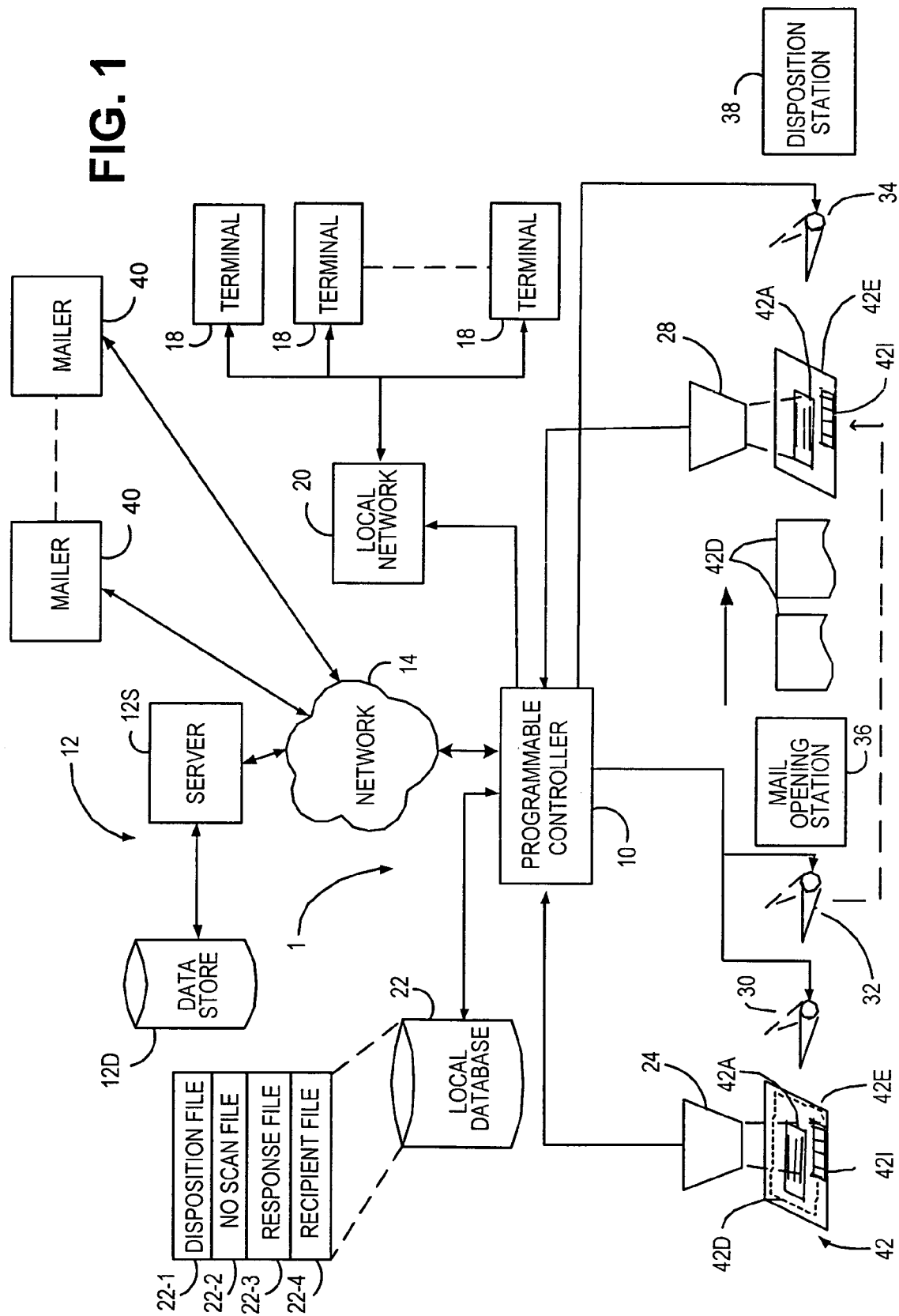
FIG. 1 shows a block diagram of a system in accordance with a preferred embodiment of the subject invention.

FIG. 1 shows system 1 in accordance with a preferred embodiment of the subject invention wherein programmable controller 10 communicates with: database system 12 through network 14 to access alternative material, terminals 18 through network 20 for delivery of such alternative material, and with local database 22, which contains disposition file 22-1, no-scan file 22-2, and response file 22-3. Database 22 also contains recipient file 22-4; linking recipient mailing addresses and recipient electronic addresses. Controller 10 also controls: identifier scanner 24 for scanning identifier 42i for identifying information linking mail piece 42 to alternative material, address scanner 28 for scanning address information 42a from envelope 42e, and gates 30, 32 and 34 for directing the flow of mail piece 42 through system 1. System 1 also includes conventional mail opening station 36 for opening mail piece 42 for scanning and conventional disposition station 38 for determining if all or part of mail piece 42 is to be filed or discarded after scanning. Preferably, network 14 is a public network such as the Internet or the switched telephone network but can be any convenient network. Network 20 can also use any convenient technology, such as the Ethernet protocol; and details of network technology do not form any part of the subject invention as claimed.

Typically stations 36 and 38 will function under operator control because the wide variety of mail pieces which can be expected will require human judgment or dexterity to assure that the mail pieces are properly scanned and disposed after processing. However, particularly where the mail stream is presorted and more uniform, or more extensive descriptions are provided by scanning the mail pieces, it would be within the ability of those skilled in the art to provide automated opening or disposition stations; and such embodiments are within the contemplation of the subject invention.

Database system 12 comprises database store 12d, which stores alternative digital material associated with particular material and server 12s which responds to requests for alternative digital material from controller 10. Alternative material is created by mailers 40 and downloaded to server 12s through network 14 in any convenient manner. Server 12s then stores the alternative material in store 12d and returns identifying information providing a link to the alternative material to mailer 40. Mailer 40 can then affix identifiers to mail pieces; allowing system 10 to access the alternative material, as will be described further below. Alternatively, identifying information is created by mailer 40 and returned to database system 12. Of course, the identifying information must be constrained to prevent separate mailers from returning the same identifying information. The alternative digital materials may be digital files such as graphics, video, audio, Flash™, PowerPoint™, etc. In another embodiment of the subject invention, where recipients have access to the Internet or similar networks, the alternative digital materials can include URLs or links to web pages. Accessing these URLs would provide a recipient with alternative information and would give feedback to the mailer about who accessed the content and when.

System 1 operates on mail piece 42 as will be described further below with respect to FIG. 2. Preferably, identifier 42i and address 42a are printed or affixed to envelope 42e. The identifier can be in any convenient form, such as a barcode, watermark or Radio Frequency ID (hereinafter sometimes RFID), and can be affixed to either the envelope or its contents. In addition to the identifying information linking the alternative material to mail piece 42 identifier 42i can include other information which can be used by controller 10 to control processing of mail piece 42, such as:
mailer ID;
date;
content type (e.g. confidential material, legal document, alternative material complete, etc.); or
an indication of response software in the alternative material.

Figure 2:
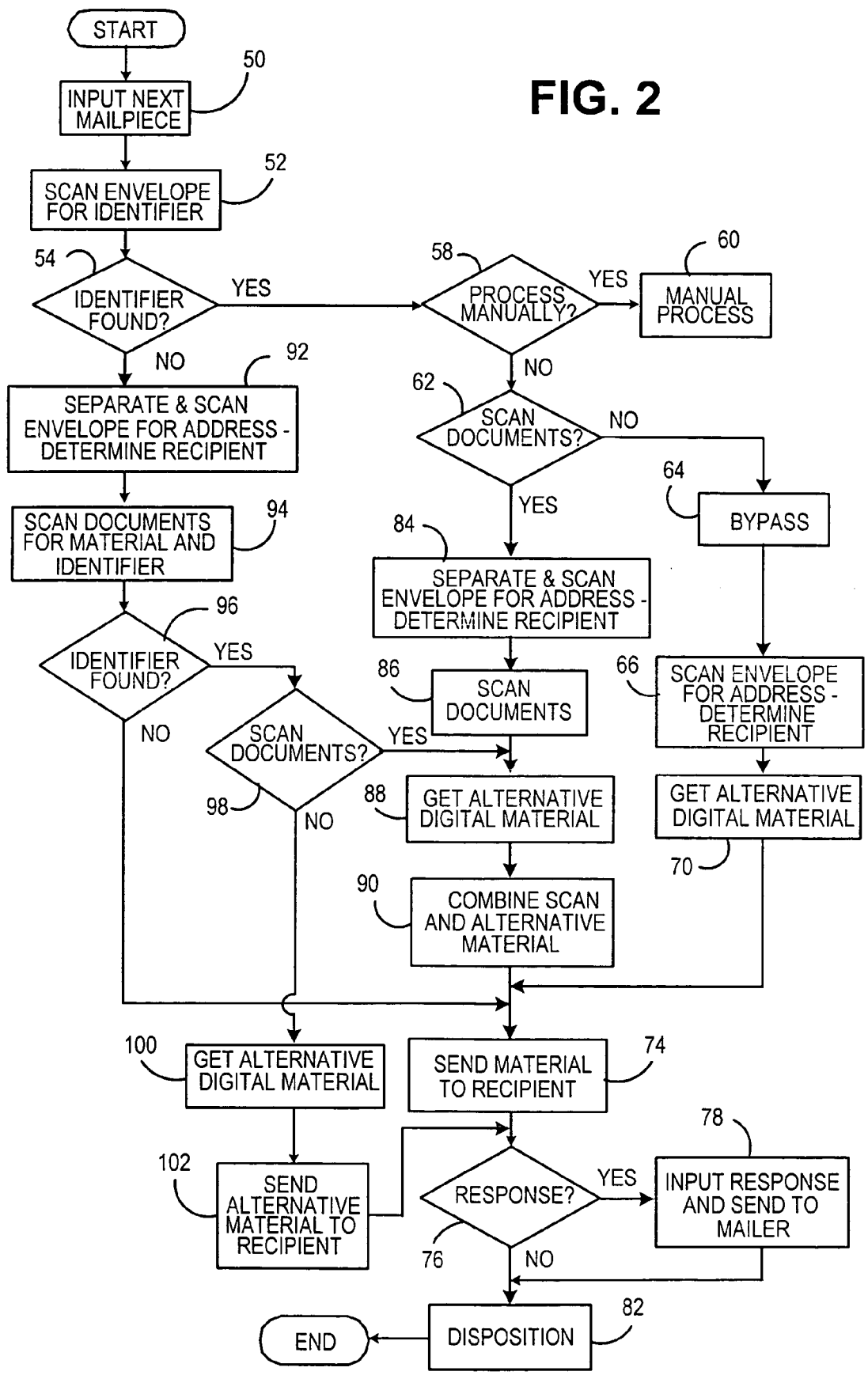
FIG. 2 shows a flow diagram of the operation of the system of FIG. 1 in accordance with the method of the subject invention.

Turning to FIG. 2, a flow diagram of the operation of system 1 in accordance with one embodiment of the subject invention is shown. At step 50 system 1 inputs next mail piece 42 and at step 52 scanner 24 scans mail piece 42, which includes envelope 42e, and documents or other contents 42d (shown in phantom) to obtain identifying information represented by identifier 42i. Scanner 24 is selected in accordance with the form of identifier 42i, e.g. barcode reader, RFID scanner, etc. Conventional character recognition technology (OCR) can be used where identifier 42i is in human readable form. In other embodiments of the invention scanner 24 can also obtain address information at step 52 if such information is provided in a form compatible with scanner 24. In still other embodiments, such address information is used as identifying information linking alternative material which is of general, but local, interest; e.g. ads for local businesses.

At step 54 controller 10 determines if identifier 42i has been found and, if so at step 58 accesses disposition file 22-1 in local data store 22 and determines if mail piece 42 should be processed manually and, if so, at step 60 activates gate 30; or diverts mail piece 42 for manual processing in any other convenient manner. Mail piece 42 can be identified to be diverted for manual processing either because operating experience shows that mail having certain identifiers 42i requires manual processing (e.g. discarding, unopened delivery without alternative material, etc.) or because identifier 42i includes information about mail piece 42 indicating the need for manual processing (e.g. legal documents).

If controller 10 determines that manual processing is not required, then, at step 62 controller 10 accesses file 22-2 in data store 22 to determine if it is necessary to scan documents 42d. Again this determination can be based either on operating experience or information supplied in identifier 42i indicating the alternative material is complete; thus allowing the user of system 1 to avoid the need for physical delivery of mail piece 42 while allowing mailer 40 to offer alternative materials which can be delivered electronically without needing to know if the recipient organizations are capable of receiving electronically delivered material. If controller 10 determines that documents 42d do not need to be scanned, then at step 64 it activates gate 32; or diverts mail piece 42 for unopened scanning in any other convenient manner.

At step 66 controller 10 controls scanner 28 to capture address 42a from (unopened) envelope 42e and determine the recipient. Preferably, scanner 28 captures an image of address 42a and controller 10 uses conventional character recognition technology to recover address information and determines a recipient address in accordance with the address information. Note that the recipient need not be the addressee identified in address 42a but, for example, can be the successor or supervisor of a person who has left the organization. Preferably, a default address is provided where a recipient cannot be identified. Typically, the recipient address will be an electronic mailbox maintained on network 20 for the determined recipient.

At step 70 controller 10 sends identifying information from identifier 42i to server 12s through network 14. Server 12s then accesses data store 12d and downloads corresponding alternative material to controller 10. Alternative materials are typically provided and designed by a mailer, and can include multimedia material (e.g. audio, video, etc. material). These multimedia capabilities, available via the internet can maintain, supplement or replace some of the attributes of the physical mail (e.g. shape, texture, color, mobility, etc.) that are lost in the process of scanning and forwarding the scanned image through email. For security reasons database system 12 is preferably operated by a known third party who is trusted to authenticate the safety of downloaded alternative materials.

Then at step 74 sends the material to the determined recipient and at step 76 accesses response file 22-3 to determine if the alternative material provides for a response and if the system user wishes to allow such responses from the recipient. If so, and if controller 10 is programmed to permit the response, then at step 78 controller 10 inputs the recipient's response and sends it to the mailer in any convenient manner. In other embodiments, the presence of response software in alternative materials can be indicated in identifier or by system 12. Such responses can be passive, where the recipient can choose to supply information, or can be active where the response software monitors the recipient's response to the alternative material, e.g. what parts of the material were opened, what links were used, time spent, etc. The importance of obtaining such active, executable response software through a trusted third party will be particularly clear.

Then at step 82 mail piece 40 goes to disposition station 38 where a determination of the appropriate disposition is made, which, as noted above, typically will require operator judgment. In other embodiments, in at least some cases, controller 10 accesses file 22-1 to determine the disposition of mail piece 42; and activates gate 34; or diverts mail piece 42 for filing (or alternatively discarding) in any other convenient manner.

Returning to step 62, if the determination is made that documents 42d are to be scanned, at step 84 mail piece 42 goes to opening station 36 where it is separated, and controller 10 controls scanner 28 to capture address 42a and recover address information substantially as described above in regard to step 66. Note that because of the great variety of forms that mail piece 42 can have, and because the need to preserve the order of documents 42d may be critical, separation of mail piece 42 typically will require operator intervention.

Then at step 86 scanner 28 captures content information, preferably in the form of images of documents 42d. Preferably, the images are then processed as bit map images; though in other embodiments of the subject invention conventional character recognition and data compression technologies can be used to reduce storage and bandwidth requirements.

At step 88 controller 10 gets alternative material substantially as described above with regard to step 70, and at step 90 combines the alternative material and the scanned material in any convenient manner; then goes to step 74 and continues as described above.

Returning to step 54, if identifier 42i is not found, then at step 92 mail piece 42 goes to opening station 36 where it is separated and envelope 42e is scanned to recover address information substantially as described above in regard to step 66. Then at step 94 documents 42d are scanned for images substantially as described above with regard to step 86. Additionally at step 94 controller 10 processes the captured image to recover identifier 42i if it is present on documents 42d. Recovery of barcode, or other forms which can be taken by identifier 42i when affixed to documents 42d, from captured images is well within the ability of those skilled in the art and need not be discussed further here for an understanding of the subject invention.

Then at step 96 controller 10 determines if identifier 42i has been found. If not, it goes to step 74 and continues as described above to deliver only material scanned from documents 42d to the recipient. Otherwise at step 98 controller 10 determines if documents 42d are to be scanned substantially as described above with regard to step 62. If not, at step 100 controller 10 gets alternative material substantially as described above with regard to step 70; at step 102 delivers only alternative material to the recipient, and goes to step 76 and continues as described above.

(In other embodiments of the subject invention, where there is knowledge of the possible position(s) where identifier 42i can be found, the scan at step 94 can be limited to a scan for identifier 42i, and documents 42d are scanned only after the need to capture the document images is found. In general however such prior knowledge is not available and it is preferable that the entire document image be captured at step 94, even though the scanned material may not be needed.)

If, at step 98, it is determined that documents 42d are to be scanned, controller 10 goes to step 88 and continues as described above.

Figure 1A:
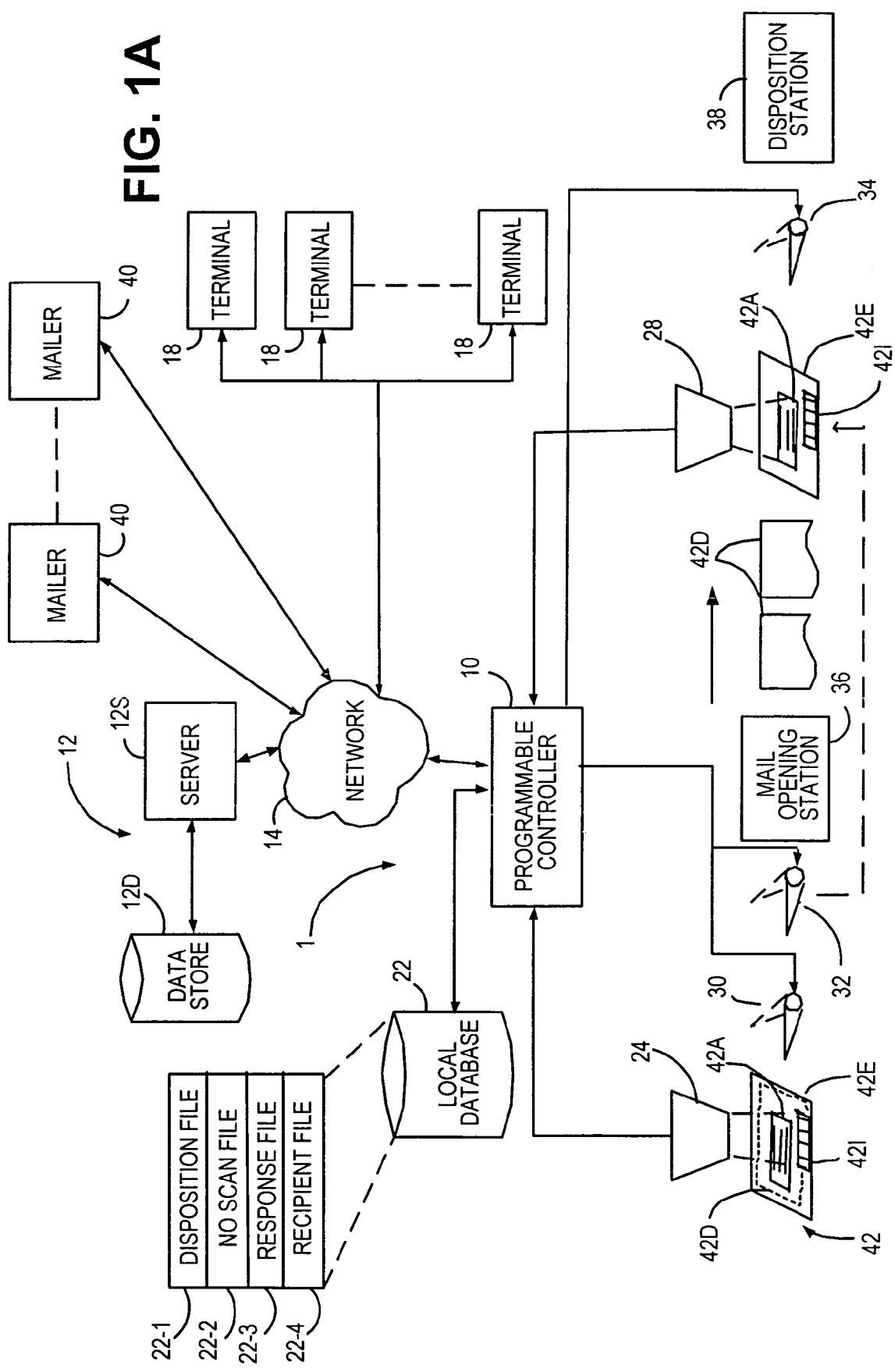
FIG. 1a shows a block diagram of a system in accordance with another preferred embodiment of the subject invention.

In another embodiment of the subject invention, shown in FIG. 1a, network 14 is the Internet or similar network, network 20 is not provided, and terminals 18 communicate with controller 10 through network 14. Otherwise system 1a is essentially similar to system 1 and operation of system 1a is essentially as described with respect to FIG. 2 above; except that it will be understood that alternative materials are communicated from controller 10 to terminals 18 as Internet communications or in a similar manner.

Figure 3:
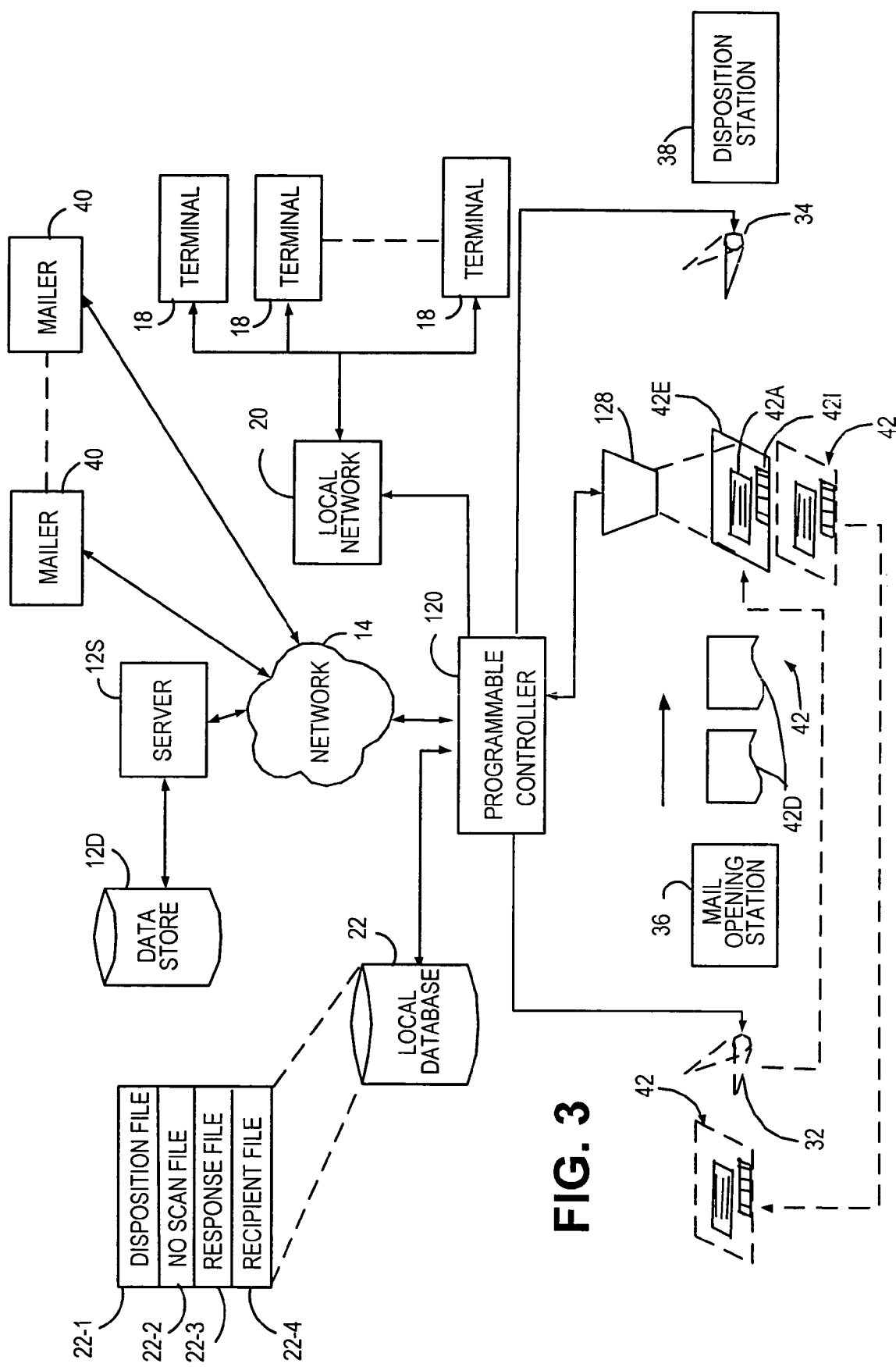
FIG. 3 shows a shows a block diagram of a system in accordance with another preferred embodiment of the subject invention.

FIG. 3 shows system 2 in accordance with a preferred embodiment of the subject invention wherein programmable controller 120 communicates with: database system 12 through network 14 to access alternative material, addressable terminals 18 through network 20 for delivery of such alternative material, and with local database 22, which contains disposition file 22-1, no-scan file 22-2, and response file 22-3. Controller 120 also controls: scanner 128 for scanning address information 42a and identifier 42i from envelope 42e, and material from documents 42d; and gate 34 for directing the flow of mail piece 42 through system 2. System 2 also includes conventional mail opening station 36 for opening mail piece 42 for scanning and conventional disposition station 38 for determining if all or part of mail piece 42 is to be filed or discarded after scanning. Except that controller 120 is programmed to operate with only scanner 128, as will be described further below, these elements are all substantially as described above with regard to FIG. 1. System 2 operates on mail piece 42 (which is also substantially as described above with regard to FIG. 1) as will be described further below with respect to FIG. 4.

Figure 4:
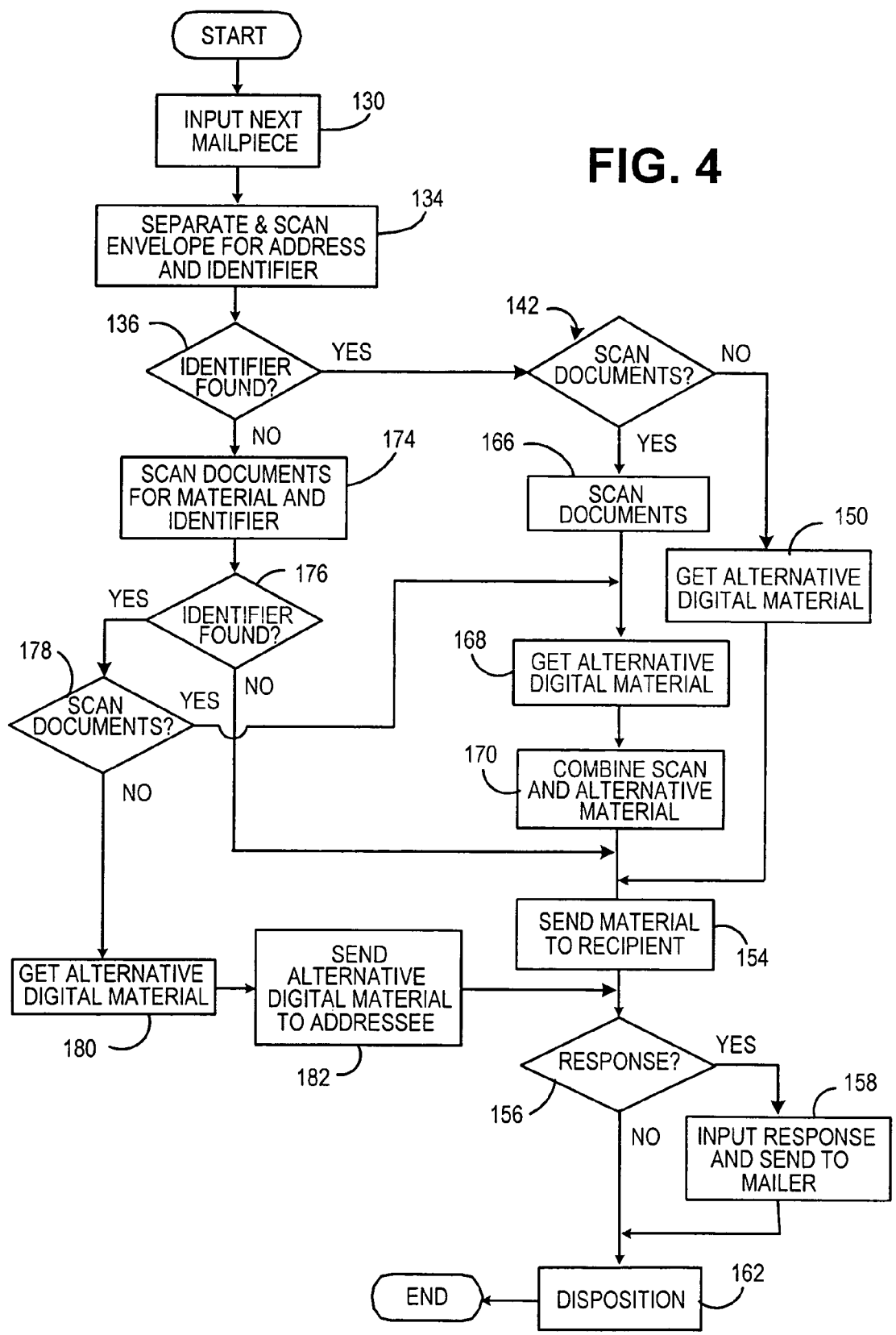
FIG. 4 shows a flow diagram of the operation of the system of FIG. 3 in accordance with the method of the subject invention.

Turning to FIG. 4, a flow diagram of the operation of the system 2 in accordance with another embodiment of the subject invention is shown. At step 130 system 2 inputs next mail piece 42 and at step 134 it goes opening station 36 where it is separated, and controller 120 controls scanner 128 to capture an image of envelope 42d. The image is then processed using conventional character recognition technology to recover address information and in a conventional manner to determine if identifier 42i is present and, if so to recover identifying information linking alternative material to mail piece 42.

At step 136 controller 120 determines if identifier 42i has been found. Then, at step 142 controller 50 accesses file 22-2 in data store 22 to determine if it is necessary to scan documents 42d substantially as described above in regard to step 62 (shown in FIG. 2). At step 150 controller 50 sends identifying information from identifier 42i to server 12s through network 14 and then, at step 154, sends the material to the identified recipient, substantially as described above in regard to steps 70 and 74 (shown in FIG. 2).

Then at steps 156 and 158 controller 120 processes any response substantially as described above in regard to steps 76 and 78 (shown in FIG. 2).

At step 162 mail piece 42 goes to disposition station 38 for disposition substantially as described above in regard to step 82 (shown in FIG. 2). As also described above, in other embodiments controller 120 can control gate 34 to automatically direct mail piece 42 for disposition; for example to discard mail pieces which do not need to be further processed at all.

Returning to step 142, if documents 42d are to be scanned then at steps 166, 168, and 170, documents 42d are scanned, alternative material is obtained from database system 12 and the scanned material and alternative material are combined, substantially as described above in regard to steps 86, 88, and 90 (shown in FIG. 2). Controller 120 then continues through steps 154, 156, 158, and 162 as described above.

Returning to step 136, if identifier 42i is not found, at step 174 controller 120 controls scanner 128 to scan documents 42d to capture the document image, and at step 176 determines if identifier 42i is present, substantially as described above in regard to steps 94 and 96. If so, at step 178 controller 120 determines if documents 42d are to be scanned, and if not at steps 180 and 182 sends only the alternative material to the identified recipient, substantially as described above in regard to steps 98, 100, and 102 (shown in FIG. 2). Otherwise, controller 120 goes to step 168 and continues to combine scanned and alternative material and complete processing of mail piece 42 as described above.

If at step 176 it is determined that identifier 42i is not present, controller 120 goes to step 154 to deliver only the scanned material and complete processing of mail piece 42 as described above. (In this case, it will be apparent that no response processing will be necessary.)

It will be apparent that the embodiment of FIG. 3 differs from that of FIG. 1 primarily in that system 3 includes only a single scanner 128. This is advantageous in that it allows existing document image processing systems to be more easily modified to incorporate the subject invention. In another embodiment of the subject invention, where it is desired to retain the capability to process mail piece 42 without necessarily opening envelope 42e, unopened envelope 42e is initially scanned by scanner 128 (as shown in phantom in FIG. 3) to capture identifier 42i (and possibly address 42a) and then transported to and processed though gate 32 (also shown in phantom in FIG. 3), is either opened by station 36 or bypasses station 36 as determined by controller 10 in accordance with identifier 42i, and is processed by the remaining elements of System 3 substantially in accordance with the flow diagram of FIG. 2. It will also be apparent that system 3 can be modified so that terminals 18 communicate with controller 10 through network 14, as described above with respect to FIG. 1a.

Figure 5:
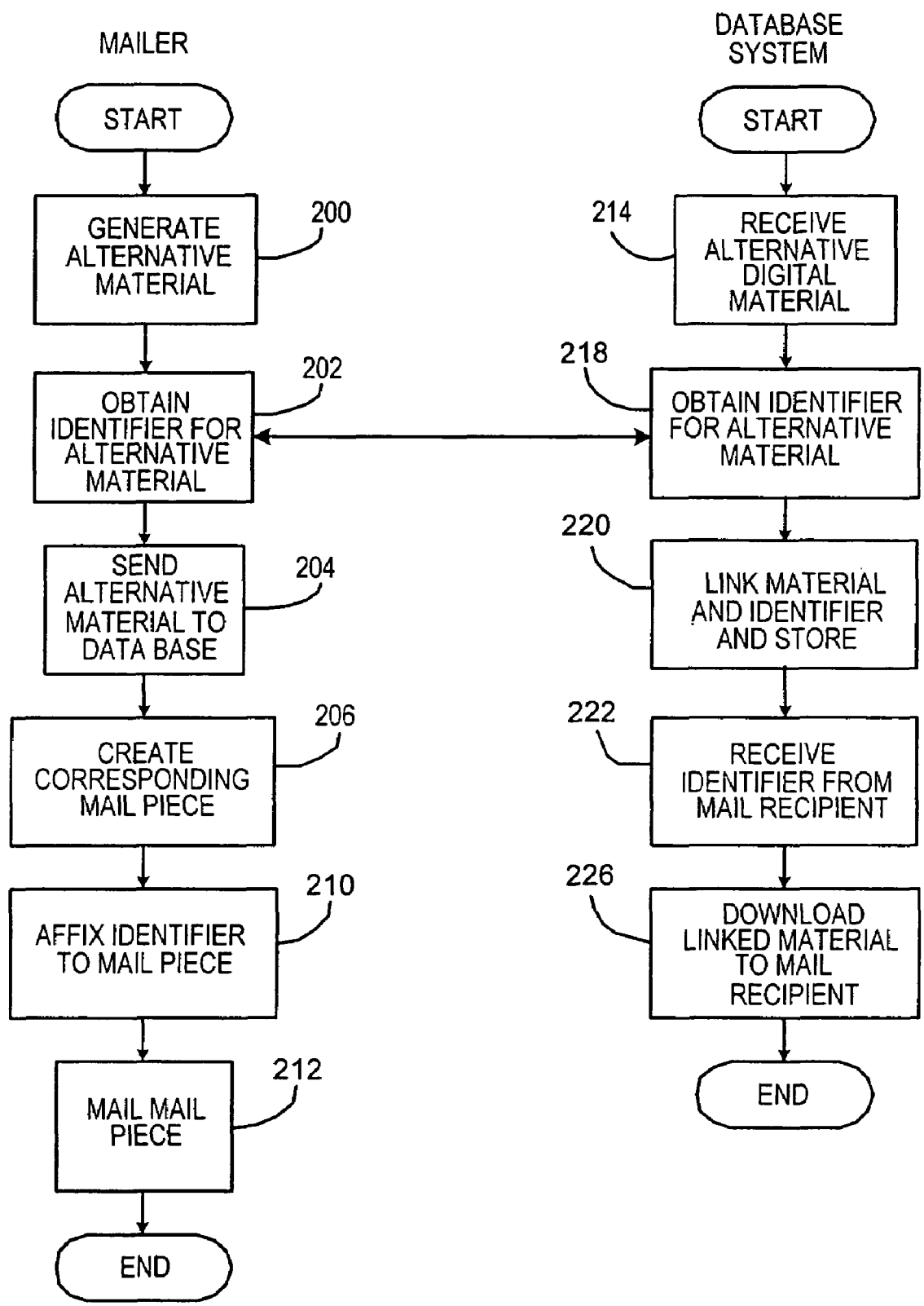
FIG. 5 shows a flow diagram of a process for creating identifiers linking mail pieces and alternative material.

In FIG. 5 a process for creating identifiers which are affixed to mail pieces and which link the mail pieces to alternative digital material, as described above, is described. At step 200 mailer 40 generates alternative digital material which the mailer wishes to link to at least one corresponding mail piece. At step 202 mailer 40 obtains an identifier that is uniquely associated with the alternative material. Mailer 40 can obtain the identifier either by creating it or by requesting an identifier from database system 12, as will be described further below. Then, at step 204 mailer 40 sends the alternative material to database system 12; at step 206 creates the corresponding mail piece, or pieces; at step 210 affixes the identifier to the mail piece; and at step 212 mails the mail piece in a conventional manner.

Concurrently, at step 214 database system 12 receives the alternative material from mailer 40, and at step 218 obtains the associated identifier. As noted above the identifier can initially be created by system 12 in response to a request from mailer 40 or can be initially created by mailer 40 an provided to system 12 with the alternative material. In either case, care must be taken to assure that a unique association between the identifier and the material is maintained. Numerous ways of achieving this will be apparent to those skilled in the art; details of which form no part of the subject invention except as may be explicitly claimed. Then, at step 220 system 12 links and stores the identifier and the associated alternative material; at step 222 receives the identifier from a controller 10 (i.e. from an intermediate mail recipient such as a corporate mailroom); and at step 226 downloads the alternative material to controller 10.

It should be noted that transport of mail pieces through systems in accordance with the subject invention can be achieved in any convenient manner, details of which form no part of the invention as claimed.

The embodiments described above and illustrated in the attached drawings have been given by way of example and illustration only. From the teachings of the present application, those skilled in the art will readily recognize numerous other embodiments in accordance with the subject invention. Accordingly, limitations on the subject invention are to be found only in the claims set forth below.

What is claimed is:

1. A method for delivering alternative material to a designated recipient of a mail piece, said method comprising the steps of:
   a) scanning said mail piece for address information;
   b) determining a recipient address in accordance with said address information;
   c) scanning said mail piece for an identifier and reading identifying information from said identifier;
   d) identifying and accessing said alternative material in accordance with said identifying information;
   e) making a determination based upon said identifier and, in accordance with said determination, scanning contents of said mail piece to obtain scanned content information; and
   f) delivering said scanned content information and said alternative material to said recipient address.

2. The method as described in claim 1 where said alternative material includes multimedia material.

3. The method as described in claim 1 where said alternative material is in digital form and is accessed over a public network.

4. The method as described in claim 1 where said alternative material is delivered to said recipient address over a local network.

5. A method for delivering alternative material to a designated recipient of a mail piece, said method comprising the steps of:
   a) scanning said mail piece for address information;
   b) determining a recipient address in accordance with said address information;
   c) scanning said mail piece for an identifier and reading identifying information from said identifier;
   d) identifying and accessing said alternative material in accordance with said identifying information;
   e) making a determination based upon said identifier and, in accordance with said determination, scanning contents of said mail piece to obtain scanned content information; and
   f) delivering said scanned content information and said alternative material to said recipient address;
wherein said alternative material is one of a mailer's alternative material and a third party's alternative material and said alternative material includes response software for determining and returning to said one of the mailer of said mail piece and the third party data representative of a recipient's response to said alternative material.

6. The method as described in claim 5 comprising the further steps of:

a) making a determination based upon said identifier and, in accordance with said determination;
b) returning, or preventing return of, said data.

7. A system for delivering alterative material to a designated recipient of a mail piece, said mail piece having affixed thereto an identifier, comprising:
   a) a programmable controller;
   b) scanning means for scanning said mail piece, said scanning means communicating with said programmable controller; where
   c) said programmable controller has a communications link to a data base system and a second communications link to a plurality of addressable terminals, and is programmed to:
      c1) control said scanning means to scan said mail piece for address information;
      c2) determine a terminal address associated with said designated recipient in accordance with said address information;
      c3) control said scanning means to scan said mail piece for an identifier and read identifying information from said identifier;
      c4) identify and access said alternative material in accordance with said identifying information; and
      c5) deliver said alternative material to one of said terminals corresponding to said terminal address;
   wherein said controller is further programmed to
   a) make a determination based upon said identifier and, in accordance with said determination, scan contents of said mail piece to obtain scanned content information; and deliver said scanned content information to said one terminal together with said alternative material.

8. The system as described in claim 7 where said scanning means comprises a separate address scanner and a separate identifier scanner.

9. A system for delivering alterative material to a designated recipient of a mail piece, said mail piece having affixed thereto an identifier, comprising:
   a) programmable controller;
   b) scanning means for scanning said mail piece, said scanning means communicating with said programmable controller; where
   c) said programmable controller has a communications link to a data base system and a second communications link to a plurality of addressable terminals, and is programmed to;
      c1) control said scanning means to scan said mail piece for address information;
      c2) determine a terminal address associated with said designated recipient in accordance with said address information;
      c3) control said scanning means to scan said mail piece for an identifier and read identifying information from said identifier;
      c4) identify and access said alternative material in accordance with said identifying information; and
      c5) deliver said alternative material to one of said terminals corresponding to said terminal address;
   wherein said alternative material includes response software for determining and returning to said mailer data representative of a recipient's response to said alternative material, and said controller is further programmed to;
   a) make a determination based upon said identifier and, in accordance with said determination,
   return, or prevent return of, said data.

* * * * *